(12) United States Patent
Arora et al.

(10) Patent No.: US 9,735,410 B2
(45) Date of Patent: Aug. 15, 2017

(54) COMPOSITE SEPARATOR FOR ELECTROCHEMICAL CELL CAPABLE OF SUSTAINED SHUTDOWN

(71) Applicant: E I DU PONT DE NEMOURS AND COMPANY, Wilmington, DE (US)

(72) Inventors: Pankaj Arora, Chesterfield, VA (US); Natalia V Levit, Glen Allen, VA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 402 days.

(21) Appl. No.: 14/533,340

(22) Filed: Nov. 5, 2014

(65) Prior Publication Data

US 2015/0125737 A1     May 7, 2015

Related U.S. Application Data

(60) Provisional application No. 61/899,915, filed on Nov. 5, 2013.

(51) Int. Cl.

| | |
|---|---|
| *H01M 2/16* | (2006.01) |
| *H01G 11/52* | (2013.01) |
| *H01G 11/58* | (2013.01) |
| *H01G 9/02* | (2006.01) |
| *H01M 10/052* | (2010.01) |
| *H01G 11/04* | (2013.01) |
| *H01G 11/68* | (2013.01) |
| *H01M 2/14* | (2006.01) |

(Continued)

(52) U.S. Cl.
CPC ............ *H01M 2/1666* (2013.01); *H01G 9/02* (2013.01); *H01G 11/04* (2013.01); *H01G 11/52* (2013.01); *H01G 11/58* (2013.01); *H01M 2/162* (2013.01); *H01M 2/1626* (2013.01); *H01M 2/1653* (2013.01); *H01M 2/1686* (2013.01); *H01M 10/052* (2013.01); *H01G 11/06* (2013.01); *H01G 11/68* (2013.01); *H01M 2/145* (2013.01); *H01M 10/0525* (2013.01); *Y02E 60/13* (2013.01)

(58) Field of Classification Search
CPC .. H01M 2/162; H01M 2/1626; H01M 2/1653; H01M 2/1686
USPC ........................................... 429/145
See application file for complete search history.

(56) References Cited

U.S. PATENT DOCUMENTS

| | | |
|---|---|---|
| 7,618,579 B2 | 11/2009 | Kim et al. |
| 8,557,444 B2 | 10/2013 | Arora et al. |

(Continued)

FOREIGN PATENT DOCUMENTS

| | | |
|---|---|---|
| WO | WO2012100049 | 7/2012 |

OTHER PUBLICATIONS

U.S. Appl. No. 12/899,770, filed Oct. 22, 2012, DuPont.

(Continued)

*Primary Examiner* — Basia Ridley
*Assistant Examiner* — James Erwin

(57) ABSTRACT

This invention provides a multi-layer article comprising a first electrode material, a second electrode material, and a porous separator disposed between and in contact with the first and the second electrode materials, wherein the porous separator comprises a nonwoven consisting essentially of a plurality of fibers of a fully aromatic polyimide. Also provided is a method for preparing the multi-layer article, and an electrochemical cell employing the same. A multi-layer article comprising a polyimide nonwoven with enhanced properties is also provided.

21 Claims, 6 Drawing Sheets

(51) Int. Cl.
*H01M 10/0525* (2010.01)
*H01G 11/06* (2013.01)

(56) References Cited

U.S. PATENT DOCUMENTS

| | | | |
|---|---|---|---|
| 2002/0102464 A1* | 8/2002 | Yoshida | H01G 9/038 |
| | | | 429/300 |
| 2002/0175449 A1* | 11/2002 | Chu | D04H 1/728 |
| | | | 264/465 |
| 2005/0067732 A1 | 3/2005 | Kim et al. | |
| 2005/0208383 A1* | 9/2005 | Totsuka | H01M 2/162 |
| | | | 429/247 |
| 2008/0107959 A1 | 5/2008 | Ishino et al. | |
| 2010/0151311 A1* | 6/2010 | Usami | D01D 5/0084 |
| | | | 429/145 |
| 2010/0310837 A1* | 12/2010 | Bond | D04H 3/16 |
| | | | 428/196 |
| 2011/0139331 A1 | 6/2011 | Arora et al. | |
| 2011/0143185 A1 | 6/2011 | Nishikawa | |
| 2013/0224560 A1 | 8/2013 | Yoshitomi | |

OTHER PUBLICATIONS

PCT International Search Report and Written opinion for International Application No. PCT/US2014/064094 Dated Jan. 5, 2015.

* cited by examiner

COMPOSITE SEPARATOR FOR ELECTROCHEMICAL CELL CAPABLE OF SUSTAINED SHUTDOWN

FIELD OF THE INVENTION

This invention is directed to the application of nonwoven polyimide separators in lithium (Li) and lithium-ion (Li-ion) batteries as well as in other electrochemical cells.

BACKGROUND OF THE INVENTION

Polyolefin based microporous membranes are used as separators for lithium ion batteries. They offer thin and uniform structures along with small pore size and good shutdown feature, but are limited on high temperature stability, which leads to loss of structural integrity, if the battery is abused and sees higher temperatures There is a need for a separator that offers thin, uniform structures, small pore size and still offer good shutdown along with high temperature stability to improve the safety of lithium ion batteries.

The composite separator of the current invention offers a solution to this need with thin, uniform structures, small pore size, higher mechanical properties required to make good cells with a separator. It also offers good shutdown properties and maintains its structural integrity at very high temperature. This property does not allow the direct contact between the positive and negative electrodes at higher temperatures at thus helps in improving the safety of lithium ion batteries.

SUMMARY OF THE INVENTION

The present invention is directed to a multi-layer article comprising a first positive electrode material, a second negative electrode material, and a porous separator disposed between and in contact with the first and the second electrode materials. The porous separator comprises a porous film (layer A) disposed in a face to face relationship with a non-woven fabric layer (layer B).

The non-woven fabric layer B has a mean fiber diameter of 3 μm or less, a mean pore size of 6 μm or less, and porosity less than 60%.

The porous film A has a thickness of 2 μm or greater and is a micro-porous polyolefin membrane having a mean flow pore size of less than or equal to 0.5 μm and a porosity of 30 to 60%.

The B layer comprises a non-thermoplastic polymer; the B layer comprises a non-thermoplastic polymer present at a weight percentage of layer B of 50% or more and the thickness of the A layer plus the B layer combined is less than or equal to 50 μm.

In one embodiment of the multilayer article the nonwoven layer (B) is in contact with the positive electrode and is disposed in between the positive electrode and the film layer A.

The pore size of the nonwoven layer B may also in different embodiments of the invention be less than 10 μm, or 3 μm, or even 1 μm.

The thickness of the porous film A may also in different embodiments be less than 5 μm, or less than 10 μm, or less than 15 μm, or even less than 25 um.

In a further embodiment of the multilayer article the non-thermoplastic polymer is a polyimide, a poly aramid, cellulose, a polyamide imide, polyacrylonitrile, polyvinylidene fluoride or a combination of the foregoing. In the embodiment wherein the non-thermoplastic polymer is polyimide, the polyimide is a fully aromatic polyimide. The polyimide may further be characterized by a crystallinity index of 0.1 or greater. The fully aromatic polyimide may still further comprise PMDA/ODA.

In a still further embodiment of the multilayer article the nonwoven fabric layer B comprises staple fibers.

In a further embodiment of the multilayer article the first electrode material, the separator, and the second electrode material are held together in the form of a laminate.

The invention is further directed to a multi-layer article comprising;
  a first layer comprising a first metallic current collector;
  a second layer comprising the first electrode material, in contact with the first metallic current collector;
  a third layer comprising a porous separator, in contact with the first electrode material;
  a fourth layer comprising the second electrode material, contacting the porous separator; and,
  a fifth layer comprising a second metallic current collector, contacting the second electrode material.

The porous separator comprises a porous film (layer A) disposed in a face to face relationship with a non-woven fabric layer (layer B);
  said non-woven fabric layer B having a mean fiber diameter of 3 μm or less, a mean pore size of less than 3 or even less than 6, and a porosity less than 60%;
  said porous film A having a thickness of or even 2 μm or greater and is a micro-porous polyolefin membrane having a mean flow pore size of less than or equal to 0.5 μm and a porosity of 30 to 60%;
  The B layer comprises a non-thermoplastic polymer as a main constituent; and wherein the thickness of the A layer plus the B layer combined is less than or equal to 50 microns.

In this embodiment of the invention, the first metallic current collector may comprise copper foil, the first electrode material may comprise carbon, the fully aromatic polyimide separator may comprise PMDA/ODA, the second electrode material may comprise a lithium metal oxide, for example lithium cobalt oxide, lithium nickel oxide, lithium manganese oxide or mixtures thereof, and the second metallic current collector may comprise aluminum foil.

In a further embodiment, the first and second electrode materials are the same material.

In a further embodiment, the first and second current collectors are the same material.

In a still further embodiment, the first and second electrode materials are different materials.

In a further embodiment, the first and second metallic current collectors may comprise aluminum foil; the first and second electrode materials may comprise carbon; and the fully aromatic polyimide separator may comprise PMDA/ODA.

In any of the embodiments of the multi-layer article the porous membrane layer (A layer) may comprise a filler.

The polyolefin may have a peak crystal melting temperature of from 100° C. to 250° C. or even a peak crystal melting temperature of from 100° C. to 150° C.

The average thickness of the non-woven fabric layer (B layer) may be less than 15 μm or less than 10 μm, or less than 5 μm, less than 2 μm or even less than 25 μm.

The invention is also directed to a battery comprising the multi-layer article in any of the embodiments as recited above.

The invention is also directed to a capacitor comprising the multi-layer article in any of the embodiments as recited above.

In any embodiment of the invention the porous membrane layer (A layer) may be in contact, either directly or via an adhesive layer, with the non-woven fabric layer (B layer).

The multilayer article of may have a maximum resistance reached in a shutdown test divided by the initial resistance is greater than or equal to 100 and the resistance at 50° C., 75° C. or even 100° C. higher than the resistance onset temperature divided by the initial resistance is greater than or equal to 100.

The multilayer article of the invention may also have a maximum resistance reached in a shutdown test divided by the initial resistance is greater than or equal to 100 and the resistance at 50° C., 75° C. or even 100° C. higher than the resistance onset temperature divided by the initial resistance is greater than or equal to 114.

DESCRIPTION OF THE INVENTION

Figure 1:
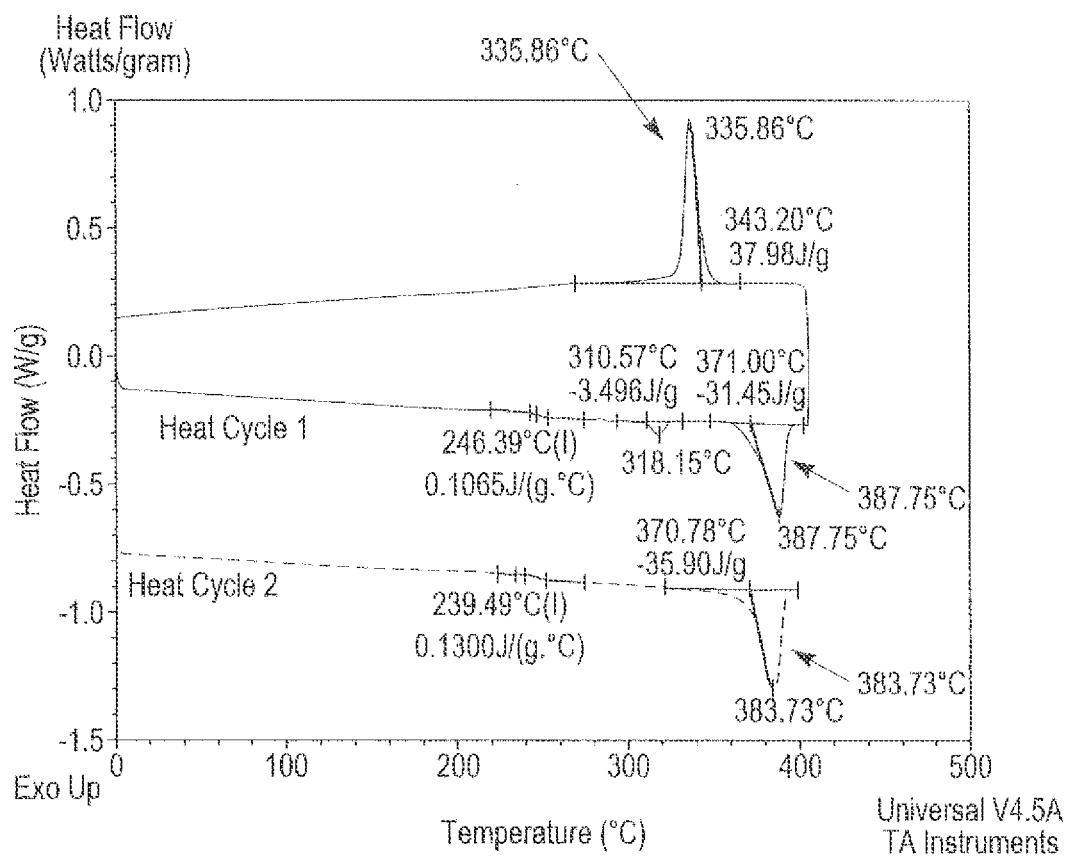
FIG. 1 shows a trace from a differential scanning calorimeter of a comparative example of a thermoplastic polyimide.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

For the purposes of the present invention, the abbreviations and designations shown in Table 1, consistent with the practice in the polyimide art, will be employed:

TABLE 1

| Abbreviation | Chemical Name | Chemical Structure |
| --- | --- | --- |
| PMDA | Pyromellitic Dianhydride | 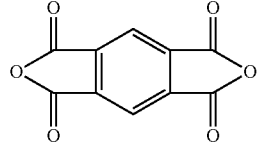 [SMILES: O=c1oc(=O)c2cc3c(=O)oc(=O)c3cc12]<br>PMDA |
| BPDA | Biphenyltetracarboxylic Dianhydride | 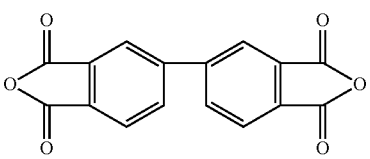 [SMILES: O=C1OC(=O)c2cc(-c3ccc4c(c3)C(=O)OC4=O)ccc21]<br>BPDA |
| ODA | Oxydianiline | 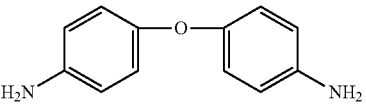<br>ODA |
| RODA | 1,3-bis(4-aminophenoxy)benzene | 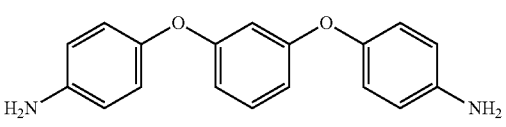<br>RODA |

TABLE 1-continued

| Abbreviation | Chemical Name | Chemical Structure |
|---|---|---|
| PDA | 1,4 Phenylenediamine | $H_2N-\text{C}_6H_4-NH_2$ (PDA) |
| TDI | 2,4-toluene diisocyanate and 2,6 toluene diisocyanate | 2,4- and 2,6-toluene diisocyanate structures |
| MDI | Methylene diphenyl 4,4'-diisocyanate | OCN–C$_6$H$_4$–CH$_2$–C$_6$H$_4$–NCO |
| BTDA | 3,3',4,4'-benzophenone tetracarboxylic dianhydride | benzophenone tetracarboxylic dianhydride structure |

It shall be understood that other dianhydrides and other diamines, not listed in Table 1, are also suitable for use in the present invention, with the proviso that suitable dianhydrides and diamines are consistent with the limitations described infra.

It is also understood that the nomenclature PMDA/ODA refers to a polyimide composition that is a combination of the monomers PMDA and ODA.

Definitions

The term "nonwoven" means a web including a multitude of randomly distributed fibers. The fibers generally can be bonded to each other or can be unbonded. The fibers can be staple fibers or continuous fibers. The fibers can comprise a single material or a multitude of materials, either as a combination of different fibers or as a combination of similar fibers each comprised of different materials. The term nonwoven as employed herein represents a subset of nonwoven articles wherein the fibers are characterized by cross-sectional diameters of less than 3 micrometers. The nonwovens employed herein define a planar structure that is relatively flat, flexible and porous, and is formed by the lay-down of one or more continuous filaments.

The fibers may preferably have a number average diameter less than 3000 nm, even less than 1000 nm, even less than 800 nm, even between about 50 nm and 500 nm, and even between about 100 and 400 nm. In the case of non-round cross-sectional fibers, the term "diameter" as used herein refers to the greatest cross-sectional dimension. The fibers employed in this invention consist essentially of one or more fully aromatic polyimides. For example, the fibers employed in this invention may be prepared from more than 80 wt % of one or more fully aromatic polyimides, more than 90 wt % of one or more fully aromatic polyimides, more than 95 wt % of one or more fully aromatic polyimides, more than 99 wt % of one or more fully aromatic polyimides, more than 99.9 wt % of one or more fully aromatic polyimides, or 100 wt % of one or more fully aromatic polyimides.

As employed herein, the term "fully aromatic polyimide" refers specifically to polyimides that are at least 90% imidized and wherein at least 95% of the linkages between adjacent phenyl rings in the polymer backbone are effected either by a covalent bond or an ether linkage. Up to 25%, preferably up to 20%, most preferably up to 10%, of the linkages may be effected by aliphatic carbon, sulfide, sulfone, phosphide, or phosphone functionalities or a combination thereof. Up to 5% of the aromatic rings making up the polymer backbone may have ring substituents of aliphatic carbon, sulfide, sulfone, phosphide, or phosphone. 90% imidized means that 90% of the amic acid functionality of the polyamic acid precursor has been converted to imide. Preferably the fully aromatic polyimide suitable for use in the present invention is 100% imidized, and preferably contains no aliphatic carbon, sulfide, sulfone, phosphide, or phosphone.

By "non-thermoplastic" is meant that the polyimide does not show a first order phase transition by differential scanning calorimetry according to methods ASTM 7138 or ISO standard 3146, both of which are incorporated herein in their entirety by reference.

The non-thermoplastic component is present at 50% by weight or more of the layer B, even 70% or more, preferably 90% or more.

"Calendering" is the process of passing a web through a nip between two rolls. The rolls may be in contact with each other, or there may be a fixed or variable gap between the roll surfaces. An "unpatterned" roll is one which has a smooth surface within the capability of the process used to manufacture them. There are no points or patterns to deliberately produce a pattern on the web as it passed through the nip, unlike a point bonding roll.

By "thickness" of a web or membrane is meant the thickness measured by test method C, ASTM5947-11, hereby incorporated in its entirety by reference. The test apparatus type C used in the present examples was Hanatek FT3 precision thickness gauge (Hanatek Instruments, East Sussex, UK) with a foot diameter of 16 mm and pressure 50 kPa. The measurements were done for fibrous sheet stacked on top of each other in total number of 4 layers. The thickness value was calculated by dividing the measured value in microns by the number of layers i.e. 4.

Basis Weight is determined according to ASTM D-3776 and reported in g/m2.

Porosity is calculated by dividing the basis weight of the sample in $g/m^2$ by the polymer density in $g/cm^3$ and by the sample thickness in micrometers and multiplying by 100 and subsequently subtracting from 100%.

Porosity (%)=(−Basis Weight/(Polymer Density× Thickness)×100%.

"Staple fibers" are discontinuous fibers of no longer than 10 cm in length. They can be of similar length like precut synthetic fiber tow or a fiber cluster of dissimilar lengths short fibers clumped together common for natural fibers, such as wool, hemp, or cotton.

By "in contact" means that two layers are touching each other in a face to face relationship over at least a portion of their surfaces. By "direct contact" is meant that the layers contact each other with no intermediate layer. By "in contact via an adhesive layer" means that an adhesive layer may be situated between the two layers that holds them in a position that is fixed relative to each other.

"Shutdown" refers to the ability of a separator to undergo an increase in resistance when heated. "Sustained shutdown" refers to a situation where the increase in resistance is maintained as a temperature rise is continued beyond the temperature of onset of a first increase in resistance. Sustained shutdown can continue to 50° C. or more above the onset temperature.

"Onset temperature" is defined as the temperature at the intersection of a first and second line drawn on the resistance versus temperature curve. The first line is drawn along the baseline, initial resistance. The second line is drawn along the portion of the curve of maximum rate of resistance increase.

Nonwoven

The article of the invention comprises a polyimide nonwoven separator (B layer) that is laminated to a microporous film (A layer.) The polyimide nonwoven separator suitable for the practice of this invention includes a plurality of fibers wherein the fibers consist essentially of a fully aromatic polyimide. At is desirable that the porosity of the non-woven fabric layer (B layer) is 60% or less, even 40% or less, even 30% or less, The invention further provides an electrochemical cell that comprises the article of the invention, namely the microporous membrane (layer A) and polyimide nonwoven (layer B) hereof as the separator between a first electrode material and a second electrode material.

Nonwovens of the required fiber diameter can be fabricated, for example without limitation, by a process selected from the group consisting of electroblowing, electrospinning, and melt blowing. The nonwovens employed in the specific embodiments presented here have been prepared by electroblowing. Electroblowing of polymer solutions to form a nonwoven is described in Kim et al., U.S. Pat. No. 7,618,579, incorporated herein by reference.

Polyimide nonwovens suitable for use in this invention are prepared by imidization of the polyamic acid nonwoven where the polyamic acid is a condensation polymer prepared by reaction of one or more aromatic dianhydride and one or more aromatic diamine. Suitable aromatic dianhydrides include but are not limited to pyromellitic dianhydride (PMDA), biphenyltetracarboxylic dianhydride (BPDA), and mixtures thereof. Suitable diamines include but are not limited to oxydianiline (ODA), 1,3-bis(4-aminophenoxy) benzene (RODA), and mixtures thereof. Preferred dianhydrides include pyromellitic dianhydride, biphenyltetracarboxylic dianhydride, and mixtures thereof. Preferred diamines include oxydianiline, 1,3-bis(4-aminophenoxy) benzene and mixtures thereof. Most preferred are PMDA. and ODA.

In the polyamic acid nonwoven imidization process hereof, the polyamic acid is first prepared in solution; typical solvents are dimethylacetamide (DMAC) or dimethyformamide (DMF). In one method suitable for the practice of the invention, the solution of polyamic acid is formed into a nonwoven by electroblowing, as described in detail below.

Unlike the solvent-soluble polyimides employed in the art in the nonwoven separators of electrochemical cells of the art, the fully aromatic polyimides employed in this invention are highly insoluble. The practitioner of the art could choose to electroblow a solution of the polyimide or a solution of the polyamic acid followed by imidization. The practitioner of the present invention must first form the nonwoven from the polyamic acid, followed by imidization of the nonwoven thus formed.

Imidization of the polyamic acid nonwoven so formed may conveniently be performed by first subjecting the nonwoven to solvent extraction at a temperature of ca. 100° C. in a vacuum oven with a nitrogen purge; following extraction, the nonwoven is then heated to a temperature of 300 to 350° C. for about 10 minutes or less, preferably 5 minutes or less, more preferably 30 seconds or less, to fully imidize the nonwoven. Imidization according to the process hereof results in at least 90%, preferably 100%, imidization. Under most circumstances, analytical methods show that 100% imidization is rarely achieved, even after long imidization times. For practical purposes, complete imidization is achieved when the slope of the percentage imidization vs. time curve is zero.

A description of the nonwoven and preparation of the nonwoven together with test methods can be found in U.S. application Ser. No. 12/899,801, "Multilayer Article Comprising Polyimide Nonwoven", hereby incorporated in its entirety by reference.

In one embodiment, the polyimide nonwoven consists essentially of polyimide fibers formed from pyromellitic dianhydride (PMDA) and oxy-dianiline (ODA), having monomer units represented by the structure,

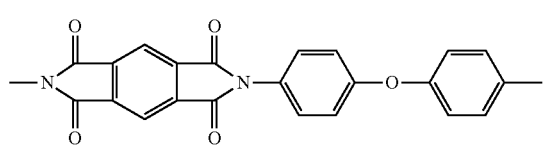

I

Polyimides are typically referred to by the names of the condensation reactants that form the monomer unit. That practice will be followed herein. Thus, the polyimide consisting essentially of monomer units represented by structure I is designated PMDA/ODA.

While the invention hereof is not limited thereby, it is believed that the method of polymerization can affect the polyimide behavior in electrolyte solutions as well. Stoichiometric configurations that allow for excess dianhydride result in polyimides with amine end groups. These amine end groups have active hydrogens which can interact with electrolyte solutions. By adjusting the stoichiometry to have a slight excess of dianhydride or by end-capping the amines with monoanhydrides, such as phthallic anhydride, those active hydrogens are deactivated, thereby reducing interaction with the electrolyte solution.

Microporous Membrane

The porous membrane layer (A layer) is a layer containing thermoplastic resin (a) as main constituent By "main constituent" is meant more than 50% by weight of the polymer constituents of the membrane. For the thermoplastic resin constituting the main constituent of the porous membrane layer (A layer), those having a peak value of the crystal melting temperature (also referred to as the "crystal melting peak temperature") in a temperature range of 100 to 250 C. are preferred, and in particular, those having the peak value in a temperature range of 100 to 175° C., and among them, in a temperature range of 100 to 150° C., are preferred.

This peak value of crystal melting temperature is the peak value of DSC crystal melting temperature collected according to JIS K7121 (ISO 3146) at a temperature increase speed of 10° C./minute using a differential scanning type calorimeter (DSC), for example model DSC-7 manufactured by Perkin-Elmer.

As long as the above condition of crystal melting temperature peak value is fulfilled, the thermoplastic resin, which is the main constituent of the porous membrane layer (A layer), does not limit the type of resin in particular. However, when the use of the present laminated porous film as a battery separator is intended, one species, or a mixed resin comprising a combination of two species or more, among polyolefin series resins such as low density polyethylene, high density polyethylene, linear low density polyethylene, ethylene vinyl acetate copolymer, polybutene, polypropylene and polymethyl pentene is desirable from the point of view of chemical resistance property, or the like, of the A layer.

It is desirable that the porosity of the porous membrane layer (A layer) is 60% or less, preferably 30-60% and more preferably 35-50%.

Regarding the average pore diameter of the porous membrane layer (A layer), it is desirable that it is 1 μm or less, preferably 0.5 μm or less and more preferably 0.2 μm or less. Note that the average pore diameter of the porous membrane layer (A layer) can be measured using for instance a porometer device manufactured by Coulter inc.

A thickness for the entirety of the present laminated porous film plus nonwoven of 100 μm or less is desirable, preferably 50 μm or less and more preferably 25 μm or less, even more preferably 15 μm or less. In addition, as the upper limit, 100 μm or less is desirable, more preferably 80 μm or less and even more preferably 50 μm or less. In regard to the thickness of each layer, it is desirable that the thickness of the porous membrane layer (A layer) is 50 μm or less, preferably 30 μm or less and more preferably 15 μm or less, and even more preferably 5 um or less.

It is desirable that the thickness of the non-woven fabric layer (B layer) is 50 μm or less and more preferably 25 μm or less and more preferably 15 μm or less, and even more preferably 10 micron or less.

Method of Production

In the following, an example of producing method for the present laminated porous film will be described. However, production method for the present laminated porous film is not limited to the producing method described in the following.

Here, a producing method will be described for the present laminated porous film comprising 2 layers, a porous membrane layer (A layer) and a non-woven fabric layer (B layer).

In this case, as a method for layering a porous membrane layer (A layer) and a nonwoven fabric layer (B layer), in addition to methods in which the film constituting each layer is laminated or adhered with an adhesive or the like, methods for directly forming and layering a non-woven fabric layer (B) over a porous membrane layer (A layer), and the like, may be used. Among these, from the point of view simplicity and productivity of production process and the like, methods for directly forming and layering a non-woven fabric layer (B) over a porous membrane layer (A layer) are desirable. Thus, a method for directly forming and layering the non-woven fabric layer (B) over the porous membrane layer (A layer) will be described below.

Membrane Layer A

The membrane layer A can be a microporous membrane made from polyolefins (polyethylene, polypropylene, poly methyl pentene etc.). The microporous membrane used here in this invention were single layer polyethylene and single layer Polypropylene membranes prepared by wet process and dry process, respectively, but are not limited to microporous membranes made of the above polymers or method of manufacturing. Any microporous membranes, which are suitable for use in battery chemistry, in terms of chemical stability, mechanical properties, dimensional stability, and structural properties are suitable candidates for layer A of this invention.

Non-Woven Layer B

The enhanced nonwoven separator of the invention is prepared by heating a nonwoven consisting essentially of fibers of a fully aromatic polyimide to a temperature within an annealing range and is made to exhibit enhanced crystallinity, strength, and reduced solvent uptake. The annealing range depends highly on the composition of the material. The annealing range is 400-500° C. for PMDA/ODA. For BPDA/RODA it is around 200° C.; BPDA/RODA will decompose if heated to 400° C. In general terms, in the process hereof the annealing range begins at least 50° C. above the imidization temperature thereof. For the purposes of the present invention, the imidization temperature for a given polyamic acid nonwoven is the temperature below 500° C. at which in thermogravimetric analysis, at a heating rate of 50° C./min, the % weight loss/° C. decreases to below 1.0, preferably below 0.5 with a precision of ±0.005% in weight % and ±0.05° C. According to the process hereof, the fully aromatic polyimide nonwoven is subject to heating in the annealing range for a period of time from 5 seconds to 20 minutes, preferably from 5 seconds to 10 minutes.

In one embodiment, a PMDA/ODA amic acid nonwoven produced by condensation polymerization from solution followed by electroblowing of the nonwoven, is first heated to ca. 100° C. in a vacuum oven with a nitrogen purge to remove residual solvent. Following solvent removal, the nonwoven is heated, preferably in an inert atmosphere such as argon or nitrogen, to a temperature in the range of 300-350° C. and held for a period of less than 15 minutes, preferably less than 10 minutes, more preferably less than 5 minutes, most preferably less than 30 seconds until at least 90% of the amic functionality has been converted (imidized) to imide functionality, preferably until 100% of the amic functionality has been imidized. The thus imidized nonwoven is then heated to a temperature in the range of 400-500° C., preferably in the range of 400-450° C., for a period of 5 seconds to 20 minutes, until a crystallinity index of 0.1 is achieved.

Multilayer Article

In one aspect, the invention provides a multi-layer article comprising a first electrode material, a second electrode material, and a porous composite separator disposed between and in contact with the first and the second electrode materials, wherein the porous separator comprises a microporous membrane (layer A) in face to face relationship with a nonwoven (layer B) that includes a plurality of fibers wherein the fibers consist essentially of a fully aromatic polyimide. In one embodiment, the first and second electrode materials are different, and the multi-layer hereof is useful in batteries. In an alternative embodiment, the first and second electrode materials are the same, and the multi-layer article hereof is a capacitor, particularly in that class of capacitors known as "electrolytic capacitors." In one embodiment, the first electrode material, the separator, and the second electrode material are in mutually adhering contact in the form of a laminate. In one embodiment the electrode materials are combined with polymers and other additives to form pastes that are adheringly applied to the opposing surfaces of the nonwoven separator. Pressure and/or heat can be applied to form an adhering laminate.

In one embodiment wherein the multi-layer article of the invention is useful in lithium ion batteries, a negative electrode material comprises an intercalating material for Li ions, such as carbon, preferably graphite, coke, lithium titanates, Li—Sn Alloys, Si, C—Si Composites, or mixtures thereof; and a positive electrode material comprises lithium cobalt oxide, lithium iron phosphate, lithium nickel oxide, lithium manganese phosphate, lithium cobalt phosphate, NMC (LiMn($\frac{1}{3}$)Co($\frac{1}{3}$)Ni($\frac{1}{3}$)O$_2$), NCA (Li(Ni$_{1-y-z}$Co$_y$Al$_z$)O$_2$), lithium manganese oxide, or mixtures thereof.

In one embodiment the multi-layer article hereof further comprises at least one metallic current collector in adhering contact with at least one of the first or second electrode materials. Preferably the multi-layer article hereof further comprises a metallic current collector in adhering contact with each the electrode material.

In another aspect, the invention provides an electrochemical cell comprising a housing having disposed therewithin, an electrolyte, and a multi-layer article at least partially immersed in the electrolyte; the multi-layer article comprising a first metallic current collector, a first electrode material in electrically conductive contact with the first metallic current collector, a second electrode material in ionically conductive contact with the first electrode material, a porous separator disposed between and contacting the first electrode material and the second electrode material; and, a second metallic current collector in electrically conductive contact with the second electrode material, wherein the porous separator comprises a microporous membrane (layer A) in face to face relationship with a nonwoven (layer B) that includes a plurality of fibers wherein the fibers consist essentially of a fully aromatic polyimide. Ionically conductive components and materials transport ions, and electrically conductive components and materials transport electrons.

In one embodiment of the electrochemical cell hereof, the first and second electrode materials are different, and the electrochemical cell hereof is a battery, preferably a lithium ion battery. In an alternative embodiment of the electrochemical cell hereof the first and second electrode materials are the same and the electrochemical cell hereof is a capacitor, preferably an electrochemical double layer capacitor or an aluminum electrolytic capacitor. When it is stated herein that the electrode materials are the same it is meant that they comprise the same chemical composition. However, they may differ in some structural component such as particle size.

In a further embodiment of the multi-layer article of the invention, at least one the electrode material is coated onto a non-porous metallic sheet that serves as a current collector. In a preferred embodiment, both electrode materials are so coated. In the battery embodiments of the electrochemical cell hereof, the metallic current collectors comprise different metals. In the capacitor embodiments of the electrochemical cell hereof, the metallic current collectors comprise the same metal. The metallic current collectors suitable for use in the present invention are preferably metal foils.

Lithium ion batteries that incorporate the separators of the invention are superior in durability in regard to both thermal stress and mechanical shock over those of the art. Lithium ion batteries that incorporate the enhanced separators of the invention are further improved.

In another aspect, the invention provides an electrochemical double layer capacitor (EDLC). EDLCs are energy storage devices having a capacitance that can be as high as several Farads. Charge storage in double-layer electrochemical capacitors is a surface phenomenon that occurs at the interface between the electrodes, typically carbon, and the electrolyte. In double layer capacitors, the separator absorbs and retains the electrolyte thereby maintaining close contact between the electrolyte and the electrodes. The role of the separator is to electrically insulate the positive electrode from the negative electrode and to facilitate the transfer of ions in the electrolyte, during charging and discharging. Electrochemical double layer capacitors are typically made in a cylindrically wound design in which the two carbon electrodes and separators are wound together, separators having high strength are desired to avoid short-circuits between the two electrodes.

A description of embodiment of the multilayer article of the invention can be found in patent application Ser. No. 12/899,801, where in the composite separator of the present invention replaces the nonwoven as employed in Ser. No. 12/899,801.

EXAMPLES

Calorimetry

Differential scanning calorimetry (DSC) was carried out on polyimide samples according to ASTM D7138 A heat-cool-heat cycle was employed at 10° C./min heating rate under nitrogen.

Ionic Resistance

Ionic Resistance is a measure of a separator's resistance to the flow of ions, and is measured using an AC impedance technique. Samples were cut into small pieces (31.75 cm diameter) and soaked in 1 M LiPF6 in 30:70 Ethylene Carbonate/Ethyl Methyl Carbonate (EC/EMC) electrolyte. The separator resistance was measured using Solartron 1287 Electrochemical Interface along with Solartron 1252 Frequency Response Analyzer and Scribner Associates Zplot (version 3.1c) software. The test cell had a 5.067 square cm electrode area that contacted the wetted separator. Measurements were done at AC amplitude of 5 mV and the frequency range of 10 Hz to 100,000 Hz. The high frequency intercept in the Nyquist plot is the separator resistance (in ohm). The separator resistance (ohm) was multiplied with the electrode area (5.067 square cm) to determine ionic resistance in ohm-cm2.

MacMullin Number (Nm) is a dimensionless number and is a measure of the ionic resistance of the separator. It is defined as the ratio of the resistivity of a separator sample filled with electrolyte to the resistivity of an equivalent volume of the electrolyte alone. It is expressed by:

$$Nm = (R_{separator} \times A_{electrode}) / (\rho_{electrolyte} \times t_{separator})$$

where Rseparator is the resistance of the separator in ohms, Aelectrode is the area of electrode in cm2, ρelectrolyte is the resistivity of electrolyte in ohm*cm, tseparator is the thickness of separator in cm.

Basis Weight

Basis Weight was determined according to ASTM D-3776 and reported in g/m2.

Porosity

Porosity was calculated by dividing the basis weight of the sample in $g/m^2$ by the polymer density in $g/cm^3$ and by the sample thickness in micrometers and multiplying by 100 and subsequently subtracting from 100%, i.e., percent porosity=100−basis weight/(density×thickness)×100.

Air Permeablility

The air permeability was measured according to ASTM Designation D726-94, "Standard Test Method for Resistance of Nonporous Paper to Passage of Air" incorporated herein by reference in its entirety. Individual samples were placed in the holder of Automatic Densometer model 4340 (Gurley Precision Instruments, Troy, N.Y.) and an air at a pressure of 0.304 (kPa) is forced through an area of 0.1 inch2 or 0.645 cm2 of the sample, recalculated by software to 1 inch2 or 6.45 cm2. The time in seconds required for 100 (cm3) of air to pass through the sample was recorded as the Gurley air permeability with the units of (s/100 cm3 or s/100 cc).

Tensile Strength

"Tensile strength" as used herein refers to the test according to ISO 9073-3. Tensile strength was determined for samples cut into 50×250 mm strips and pulled until breaking in a tensile testing machine at a rate of 50 mm/min with a gauge length of 200 mm.

Results

The DSC of thermoplastic polyimide (Aurum® PL 450C, DuPont, Wilmington, Del.) is shown in FIG. 1. The DSC scan shows glass transition temperature at about 240 C and melting point at about 384 C.

Figure 2:
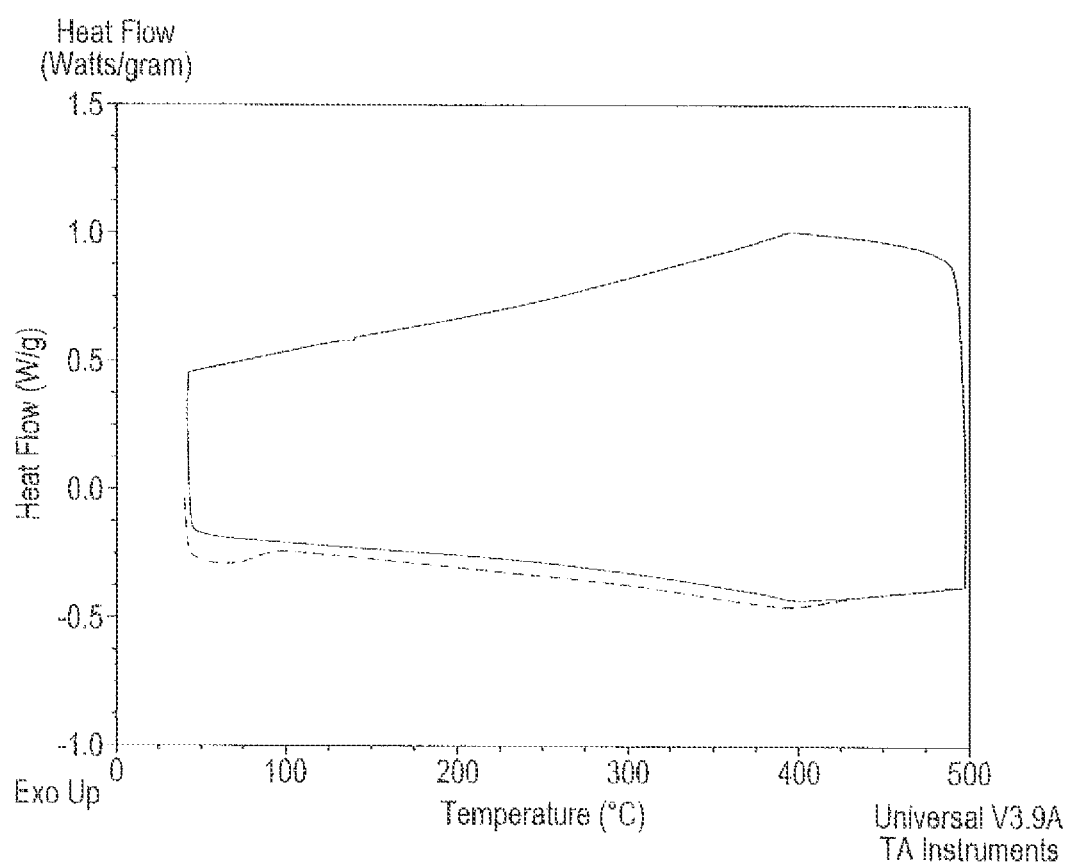
FIG. 2 shows a trace from a differential scanning calorimeter of an example polyimide employed in the invention.

The DSC of a non-thermoplastic polyimide (Kapton® H, a PMDA-ODA copolymer nanofiber web, Dupont, Wilmington Del.) is shown in FIG. 2. A glass transition temperature can be seen at about 420° C., but no crystalline melting point is detected as shown in FIG. 2. The DSC results for those polymers (the non-thermoplastic polymers described in the invention) may show a glass transition temperature but will not show a crystalline melting point peak as shown here for non-thermoplastic Polyimide.

Figure 3:
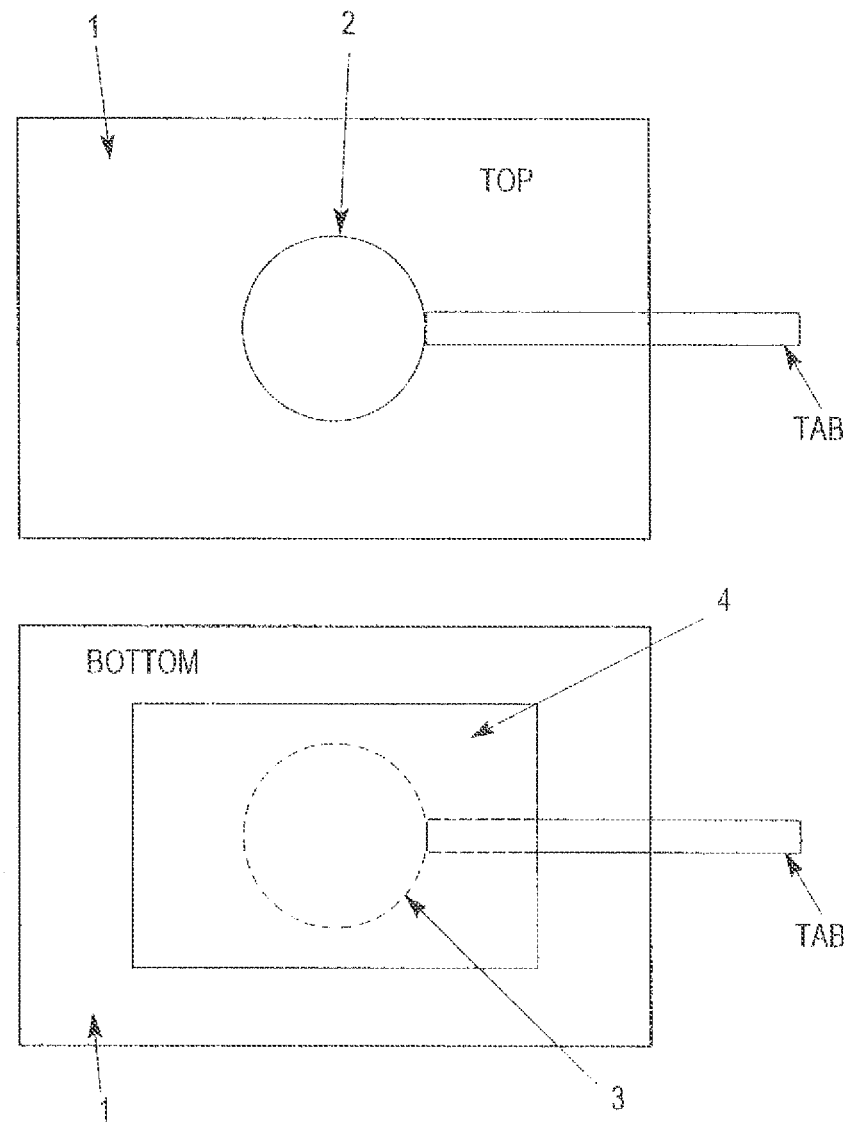
FIG. 3 shows a sketch of the shutdown measurement cell.

The shutdown test measures the increase in resistance as a function of temperature to determine the shutdown capability of battery separators. FIG. 3 illustrates a measurement cell useful for characterizing the shutdown properties of battery separators versus temperature. FIG. 3 illustrates separately the bottom part of the cell and the top part. The cell consists of two Stainless Steel (Type 304) disks (bottom disk is 25 mm, top disk is 22 mm diameter), both of which are ⅛" thick and embedded in Silicon rubber and Kapton polyimide film sandwich. Both stainless steel disks are fitted with stainless steel tabs as shown in the picture. The separator is saturated with organic electrolyte consisting of 1M lithium Bis(trifluoromethanane)sulfonimide (Aldrich) in propylene carbonate (Aldrich). The top and bottom part are used to sandwich a battery separator by placing the separator which is saturated with electrolyte between and pressing the electrodes in a Carver press with heated platens. The platens were heated at a constant rate from room temperature to 200 C using a Eurotherm model 2408 controller. The temperature of the electrode surface was measured by one E type thermocouple shown in the bottom part of the cell. The thermocouple was positioned adjacent to the bottom electrode holding the separator as shown in FIG. 3. The tabs of the electrodes were connected with Agilent 4338B milliohmmeter and the electrical resistance measurements were taken at 1 KHz as the temperature of the cell was ramped up. The test is stopped at ~200° C. and the cell was cleaned after the temperature was allowed to drop to room temperature.

Sample Preparation

Preparation of Polyamic Acid Solution 4,4 oxydianiline (ODA) (Wakayama Seika) (32.19 kg) was added to 215.51 kg of dimethylformamide (DMF) (DuPont) in a 100 gallon stainless steel reactor, followed by addition of 33.99 kg of pyromellitic dianhydride (PMDA) (DuPont Mitsubishi Gas Ltd.) and then 1.43 kg of phthalic anhydride (Aldrich Chemical) to the reactor. The reactants were stirred at room temperature for 30 hours to form polyamic acid (PAA) having a room temperature solution viscosity of 5.8 Pa·s.

Preparation of Polyamic Acid Nanowebs

The PAA solution (50 kg) prepared supra was electroblown into a fibrous web according to the process described in U.S. Published Patent Application No. 2005/0067732, hereby incorporated herein in its entirety by reference. The resulting nanoweb was about 120 microns thick with a porosity of about 85 and with a mean average fiber diameter of 500 nm. The nanoweb was then manually unwound and cut with a manual rolling blade cutter into hand sheets 30.5 cm (12") long and 25.4 cm (10") wide.

Preparation of Imidized, Calendered Nanowebs

The PAA nanoweb layers prepared supra were calendered through a steel/cotton nip at 650 pounds per linear inch and 160° C. The nanoweb layers prepared supra were heat treated according to the procedure described in copending U.S. patent application Ser. No. 12/899,770, hereby incorporated herein in its entirety by reference.

Comparative Example 2

This was same as the PE microporous membrane (layer A) described in Example 1.

Comparative Example 3

This was same as the PP microporous membrane (layer A) described in Example 2.

Results

Table 2 summarizes the results from shutdown tests on the article of the invention and comparative examples.

TABLE 2

Shutdown Test Summary

| Example | Fibrous Nonwoven Web Material (Layer B) | Microporous Membrane (layer A) Material | R min, ohm | T start, C. | Tstart + 50, C. | Rmax, ohm | R(+50 C.), ohm | Rmax/Rmin |
|---|---|---|---|---|---|---|---|---|
| 1 | PI | PE | 18.2 | 124 | 174 | 6504 | 2077 | 357 |
| 2 | PI | PP | 3.3 | 144 | 194 | 402 | 382 | 122 |
| Comp 1 | PI | None | 6.53 | 124 | 174 | 6.53 | 0 | 1 |
| Comp 2 | none | PE | 5.95 | 124 | 174 | 1058 | 0 | 178 |
| Comp 3 | none | PP | 2.9 | 144 | 194 | 322 | 200 | 111 |

The Polyimide nonwoven (layer B) has Basis Weight of 15 gsm, thickness of 22 micron, porosity of 53%, 0.61 micron mean flow pore size, 4.5 Gurley seconds air permeability, 55.6 MPa tensile strength.

Example 1

The PE microporous film was obtained from Lin Yi GeLon New Battery Materials Co. Ltd. It has basis weight of 9.3 gsm, thickness of 13.9 um, Air permeability (Gurley) of 276.2 seconds, and porosity of 53%

The PE microporous membrane (layer A) was put in face to face relation with PI nonwoven (layer B) to create a composite structure used in this invention.

Example 2

The PP microporous film was obtained from Celgard LLC (Charlotte, N.C.). Is Celgard 2400, 25 um thick, 16 gsm Basis Weight, 620 seconds Air Permeability (Gurley), and porosity of 41%.

The PP microporous membrane (layer A) was put in face to face relation with PI nonwoven (layer B) to create a composite structure used in this invention.

Comparative Example 1

This was same as the PI nonwoven layer (layer B) described above in Example 1 and 2.

Rmin was the initial resistance of the separator.
Tstart was the onset temperature of the rise in resistance during shutdown test.
Rmax was the maximum value of resistance achieved by the separator during shutdown test.
R (+50 C) was the resistance at 50° C. above the onset temperature during shutdown test.
"Comp"=comparative example.

Figure 4:
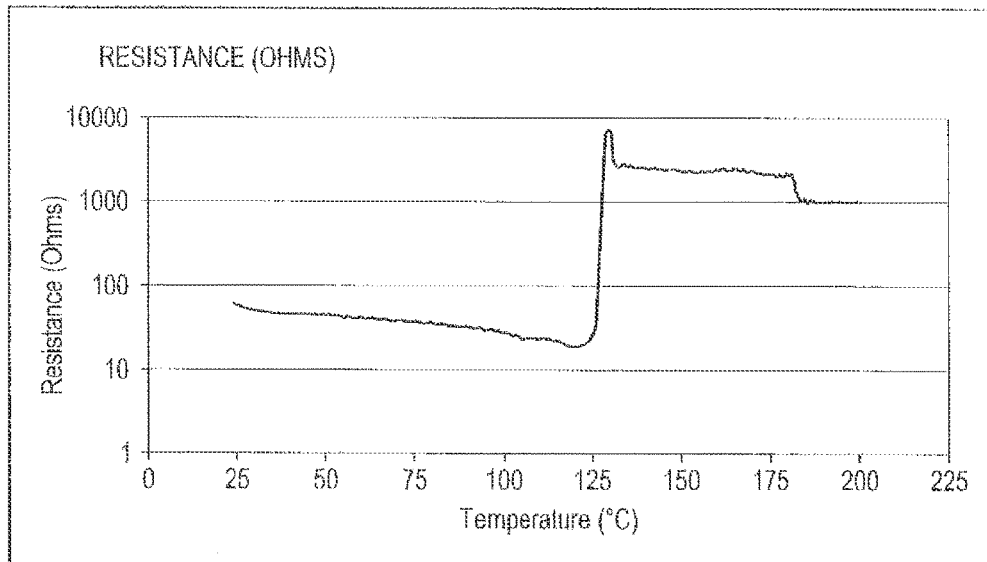
FIG. 4. Resistance increase vs. temperature for non-thermoplastic polyimide web-microporous PE film bilayer. (Example 1.)

The composite separator of Example 1 showed a sharp increase in resistance around 124° C. and maintains the higher resistance till 200° C., when the test is stopped as shown in FIG. 4. The Rmax/Rmin for the composite separator was 357. The composite separator of the invention demonstrated a good shutdown behavior and also maintained the structural integrity (as demonstrated by higher resistance) of the separator till 200° C., a property which is important to maintain the safety of the lithium ion batteries.

Figure 5:
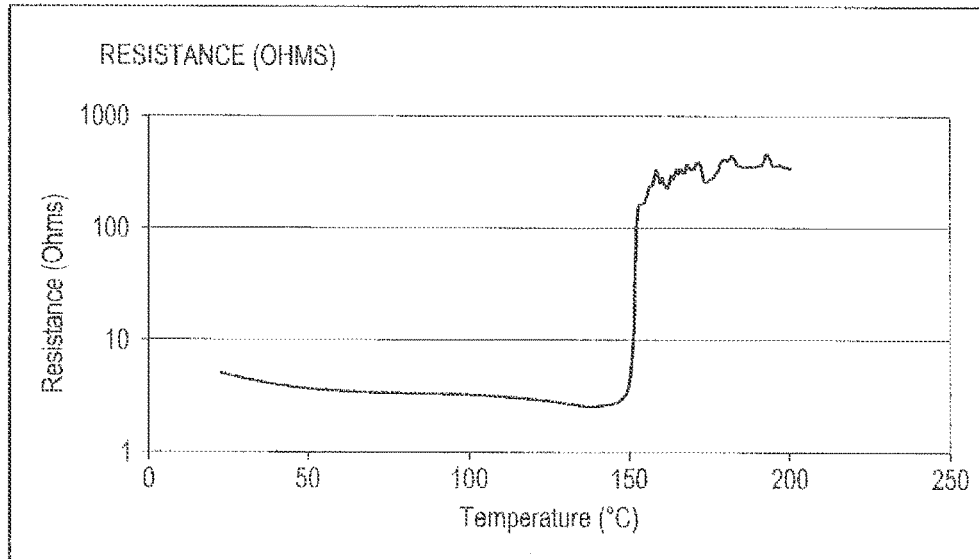
FIG. 5. Shows resistance increase vs. temperature for non-thermoplastic polyimide web-microporous PP film bilayer. (Example 2.)

The composite separator of Example 2 showed a sharp increase in resistance around 144 C and maintained the higher resistance till 200° C., when the test was stopped as shown in FIG. 5. The Rmax/Rmin for the composite separator was 122. The composite separator of the invention demonstrated a good shutdown behavior and also maintained the structural integrity (as demonstrated by higher resistance) of the separator till 200° C., a property which is important to maintain the safety of the lithium ion batteries.

Figure 6:
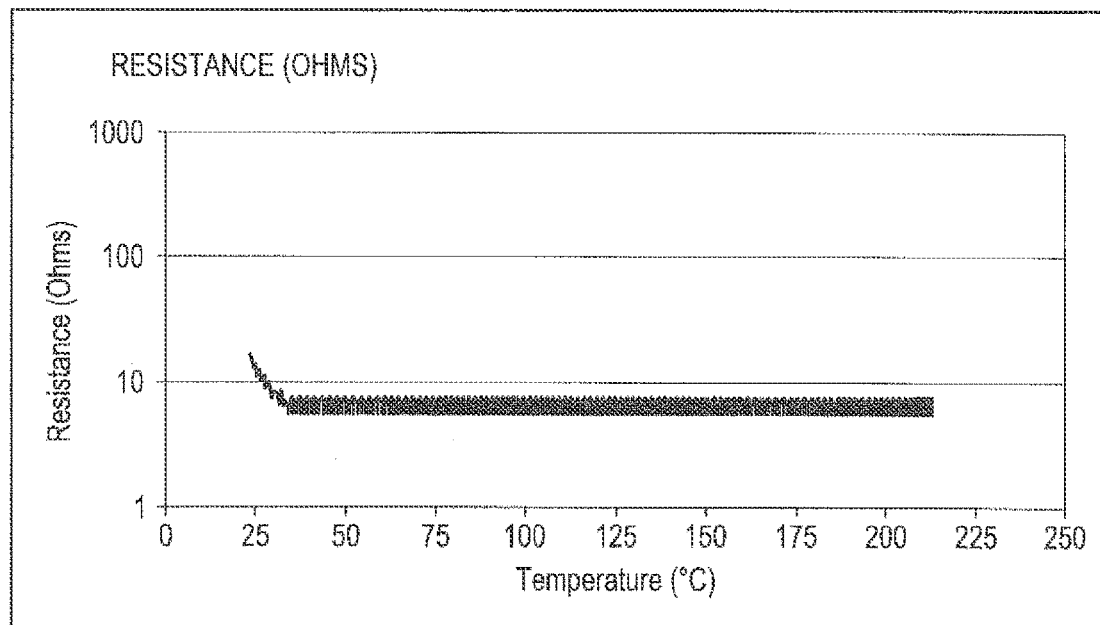
FIG. 6. Resistance increase vs. temperature for non-thermoplastic polyimide web. (Comparative example 1.)

The PI nonwoven separator of Comparative Example 1 maintained its structural integrity till 200° C., but did not demonstrate any shutdown behavior at lower temperatures (FIG. 6).

Figure 7:
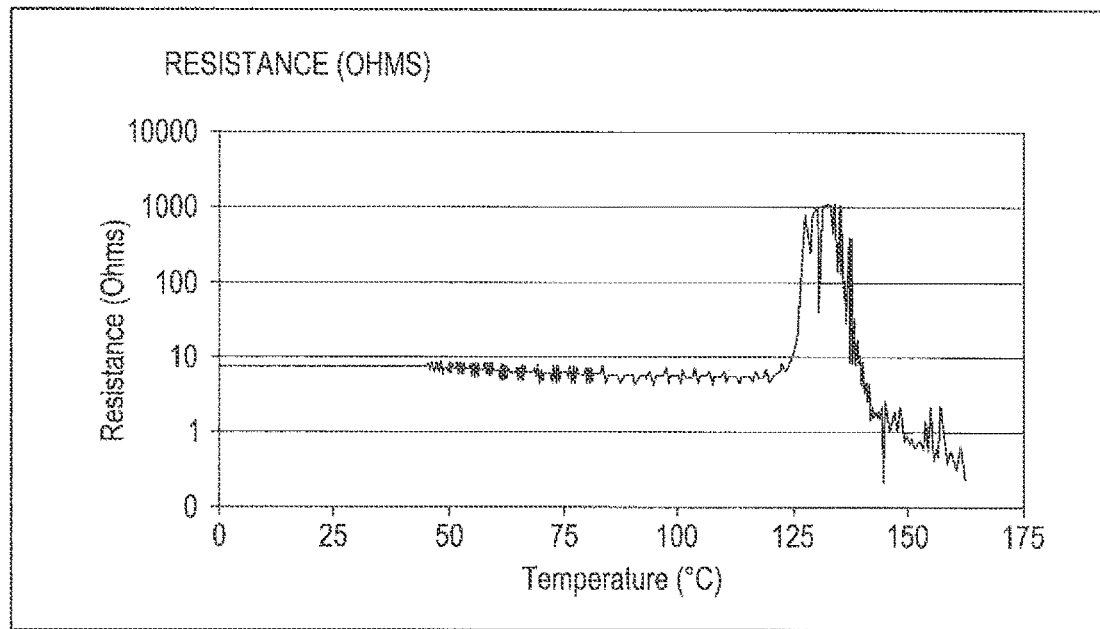
FIG. 7. Resistance increase vs. temperature for PE microporous film. (Comparative example 2.)

The PE microporous membrane of Comparative Example 2 shut down around 124 C but did not maintain its structural integrity as shown in FIG. 7. The R (+50 C) resistance was zero because the separator did not maintain its structural integrity and allowed the two electrodes to touch.

Figure 8:
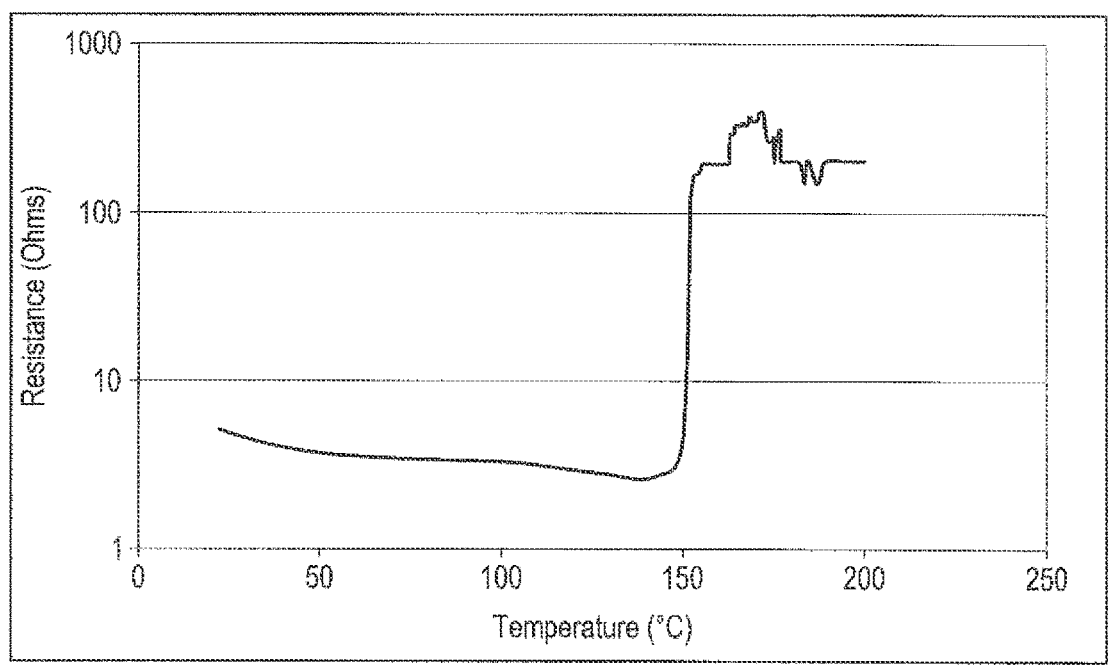
FIG. 8. Resistance increase vs. temperature for PP microporous film. (Comparative example 3.)

The PP microporous membrane of Comparative Example 3 shut down around 144° C. but does not maintain its structural integrity as shown in FIG. 8.

It is clear from the above discussion that the composite separator of the invention (Example 1 and 2) demonstrates good shutdown behavior and also maintains its structural integrity at higher temperatures, necessary to improve the safety of lithium ion batteries, while the comparative examples either show only the high temperature stability or the shutdown behavior.

We claim:

1. A multi-layer article comprising a first positive electrode material, a second negative electrode material, and a porous separator disposed between and in contact with the first and the second electrode materials, wherein the porous separator comprises a porous film (layer A) disposed in a face to face relationship with a non-woven fabric layer (layer B);
    said non-woven fabric layer B having a mean fiber diameter of 3 µm or less, a mean pore size of 6 µm or less, and a porosity less than 40%;
    said porous film A having a thickness of 2 µm or greater and is a micro-porous polyolefin membrane having a mean flow pore size of less than or equal to 0.5 µm and a porosity of 30 to 60%;
and wherein;
    the B layer consists of fibers of fully aromatic polyimide that is at least 90% imidized; and wherein the thickness of the A layer plus the B layer combined is less than or equal to 50 microns.

2. The multilayer article of claim 1 wherein the nonwoven layer (B) is in contact with the positive electrode and is disposed in between the positive electrode and the film layer A.

3. The multilayer article of claim 1 in which the nonwoven fabric layer B comprises staple fibers.

4. The multi-layer article of claim 1 wherein the polyimide is characterized by a crystallinity index of 0.1 or greater.

5. The multi-layer article of claim 1 wherein the fully aromatic polyimide comprises PMDA/ODA.

6. The multi-layer article of claim 1 wherein the first electrode material, the separator, and the second electrode material are stuck together in the form of a laminate.

7. The multi-layer article of claim 1 further comprising at least one metallic current collector in contact with at least one of the first or second electrode materials.

8. A multi-layer article comprising;
    a first layer comprising a first metallic current collector;
    a second layer comprising a first electrode material, in contact with the first metallic current collector;
    a third layer comprising a porous separator, in contact with the first electrode material;
    a fourth layer comprising a second electrode material, contacting the porous separator; and,
    a fifth layer comprising a second metallic current collector, contacting the second electrode material;
wherein the porous separator comprises a porous film (layer A) disposed in a face to face relationship with a nonwoven fabric layer (layer B);
    said non-woven fabric layer B having a mean fiber diameter of 3 µm or less, a mean pore size of 6 µm or less, and a porosity less than 40%;
    said porous film A having a thickness of 2 µm or greater and is a micro-porous polyolefin membrane having a mean flow pore size of less than or equal to 0.5 µm and a porosity of 30 to 60%;
and wherein;
    the B layer consists of fibers of fully aromatic polyimide that is at least 90% imidized; and wherein the thickness of the A layer plus the B layer combined is less than or equal to 50 microns.

9. The multi-layer article of claim 8 wherein the first metallic current collector comprises copper foil, the first electrode material comprises carbon, the fully aromatic polyimide comprises PMDA/ODA, the second electrode material comprises lithium metal oxide, and the second metallic current collector comprises aluminum foil.

10. The multi-layer article of claim 1 wherein the first and second electrode materials are the same material.

11. The multi-layer article of claim 1 wherein the first and second electrode materials are different materials.

12. The multi-layer article of claim 8 wherein the first and second electrode materials are the same material.

13. The multi-layer article of claim 8 wherein the first and second electrode materials are different material.

14. The multi-layer article of claim 8 wherein the first and second metallic current collectors comprise aluminum foil; the first and second electrode materials comprise carbon; and the fully aromatic polyimide comprises PMDA/ODA.

15. The multi-layer article of claim 1, wherein a thickness of the non-woven fabric layer (B layer) is 25 µm or less.

16. The multi-layer article of claim 1, wherein the polyolefin has a peak crystal melting temperature of from 100° C. to 250° C.

17. The multi-layer article of claim 1, wherein the polyolefin has a peak crystal melting temperature of from 100° C. to 150° C.

18. A battery or capacitor comprising the multi-layer article as recited in claim 1.

19. The multi-layer article of claim 1, wherein the porous membrane layer (A layer) is in contact, either directly or via an adhesive layer, with the non-woven fabric layer (B layer).

20. The multilayer article of claim 1 in which the maximum resistance reached in a shutdown test divided by the initial resistance is greater than or equal to 100 and the resistance at 50° C. higher than the resistance onset temperature divided by the initial resistance is greater than or equal to 100.

21. The multilayer article of claim 20 in which the maximum resistance reached in a shutdown test divided by the initial resistance is greater than or equal to 100 and the resistance at 50° C. higher than the resistance onset temperature divided by the initial resistance is greater than or equal to 114.

* * * * *